(12) United States Patent
Omiya

(10) Patent No.: US 10,081,501 B2
(45) Date of Patent: Sep. 25, 2018

(54) ADJUSTMENT DEVICE

(71) Applicant: FUJI YUSOKI KOGYO CO., LTD., Sanyoonoda-shi, Yamaguchi (JP)

(72) Inventor: Yuji Omiya, Sanyoonoda (JP)

(73) Assignee: FUJI YUSOKI KOGYO CO., LTD., Sanyoonoda-shi, Yamaguchi (JP)

( * ) Notice: Subject to any disclaimer, the term of this patent is extended or adjusted under 35 U.S.C. 154(b) by 22 days.

(21) Appl. No.: 15/320,643

(22) PCT Filed: Aug. 18, 2016

(86) PCT No.: PCT/JP2016/074131
§ 371 (c)(1),
(2) Date: Dec. 20, 2016

(87) PCT Pub. No.: WO2017/138169
PCT Pub. Date: Aug. 17, 2017

(65) Prior Publication Data
US 2018/0044123 A1 Feb. 15, 2018

(30) Foreign Application Priority Data

Feb. 8, 2016 (JP) .................................. 2016-021952

(51) Int. Cl.
*B65G 57/02* (2006.01)
*B65G 57/26* (2006.01)
(Continued)

(52) U.S. Cl.
CPC ............ *B65G 57/03* (2013.01); *B25J 9/1687* (2013.01); *B65G 57/00* (2013.01); *B65G 57/26* (2013.01)

(58) Field of Classification Search
CPC ........ B65G 57/22; B65G 57/03; B65G 47/24; B65G 47/252; B65G 47/90; B65G 57/00;
(Continued)

(56) References Cited

U.S. PATENT DOCUMENTS 4,454,705 A * 6/1984 Benno .................. B65B 13/022
53/398
4,647,028 A * 3/1987 Yang ........................ B25B 1/10
269/139
(Continued)

FOREIGN PATENT DOCUMENTS

CA 2899365 A1 * 9/2014 ............. B65G 47/90
CN 1825178 A 8/2006
(Continued)

OTHER PUBLICATIONS

Taiwan Office Action, Taiwan Patent Application No. 105134938, dated Dec. 19, 2016, with English translation of Search Report, 5 pages.
(Continued)

*Primary Examiner* — Gregory W Adams
(74) *Attorney, Agent, or Firm* — Hamre, Schumann, Mueller & Larson, P.C.

(57) ABSTRACT

To close gaps between workpieces stacked by a robot 2. A movable member 12 is provided to base members 11a, 11b so as to be movable in a stacking direction of the workpieces stacked by the robot. Adjustment members 13a, 13b are stretching in a direction of a stacking area A11 of the workpieces and are provided to the movable member 12 so as to be movable in a direction in which both members are opposing to each other. Adjustment members 14a, 14b are stretching in the direction of the stacking area A11 of the workpieces and are provided to the adjustment member 13a so as to be movable in a direction in which both members are opposing to each other. Adjustment members 15a, 15b are stretching in the direction of the stacking area A11 of the workpieces and are provided to the adjustment member 13b so as to be movable in a direction in which both members are opposing to each other.

6 Claims, 12 Drawing Sheets

(51) Int. Cl.
*B65G 57/03* (2006.01)
*B65G 57/00* (2006.01)
*B25J 9/16* (2006.01)

(58) Field of Classification Search
CPC ..... B65G 47/904; B25J 19/00; B25J 15/0253; B25J 15/0273; B25J 15/026
See application file for complete search history.

(56) References Cited

U.S. PATENT DOCUMENTS

| | | | | |
|---|---|---|---|---|
| 5,163,808 | A * | 11/1992 | Tsubone | B65G 57/26 414/791.8 |
| 5,533,860 | A * | 7/1996 | Gammerler | B65H 31/20 414/789 |
| 5,893,258 | A * | 4/1999 | Lancaster, III | B65B 11/045 414/907 |
| 7,798,763 | B2 * | 9/2010 | Ouellette | B65G 57/03 198/418.4 |
| 7,828,507 | B2 * | 11/2010 | Honegger | B65H 31/3081 414/788.9 |
| 8,356,849 | B2 * | 1/2013 | Shirasaki | B25J 1/00 294/119.1 |
| 2013/0168207 | A1 | 7/2013 | Viatte | |
| 2015/0203295 | A1 | 7/2015 | Nakamura | |
| 2016/0001992 | A1 * | 1/2016 | Takao | B65G 47/90 414/788.4 |

FOREIGN PATENT DOCUMENTS

| | | |
|---|---|---|
| CN | 202864187 U | 4/2013 |
| CN | 104955748 A | 9/2015 |
| JP | 8-290805 A | 11/1996 |
| JP | 2005-35761 A | 2/2005 |
| JP | 2011132019 A | 7/2011 |
| JP | 2013-006685 A | 1/2013 |
| JP | 2013-540084 A | 10/2013 |
| JP | 2014-156296 A | 8/2014 |
| KR | 100930536 B1 | 12/2009 |
| KR | 101082323 B1 | 11/2011 |
| WO | 20140038370 A1 | 3/2014 |

OTHER PUBLICATIONS

International Search Report, dated Nov. 22, 2016, International Patent Application No. PCT/JP2016/074131 (5 pages).
Chinese Office Action, Chinese Patent Application No. 201680001798.9, dated Mar. 5, 2018 (5 pages).

* cited by examiner

FIG. 7
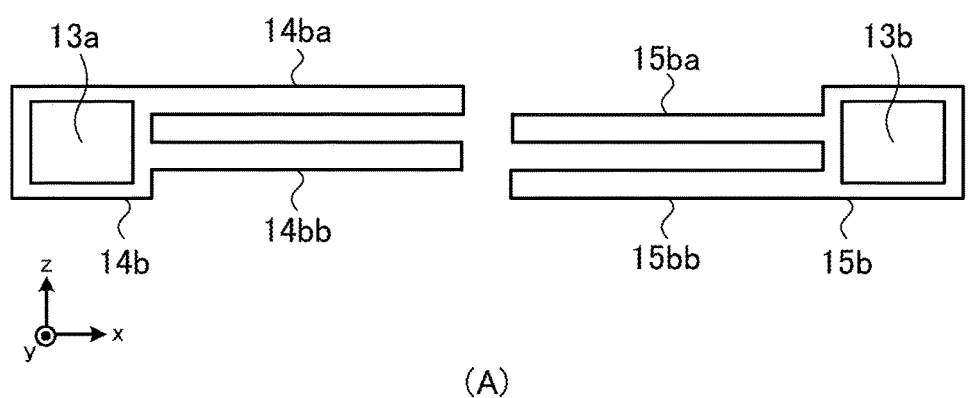
(A)
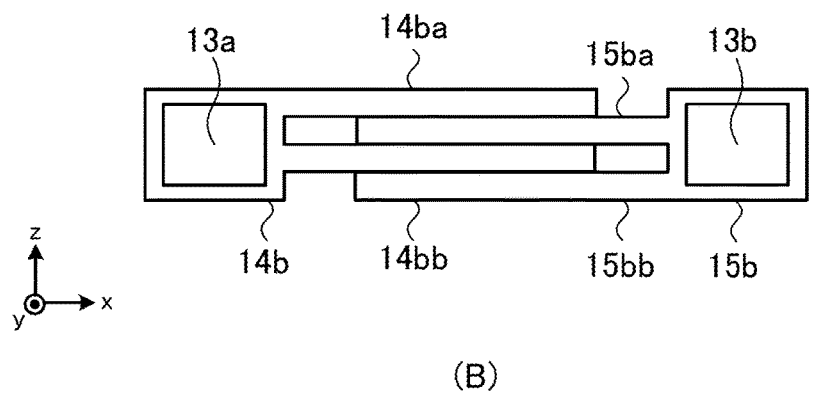
(B)

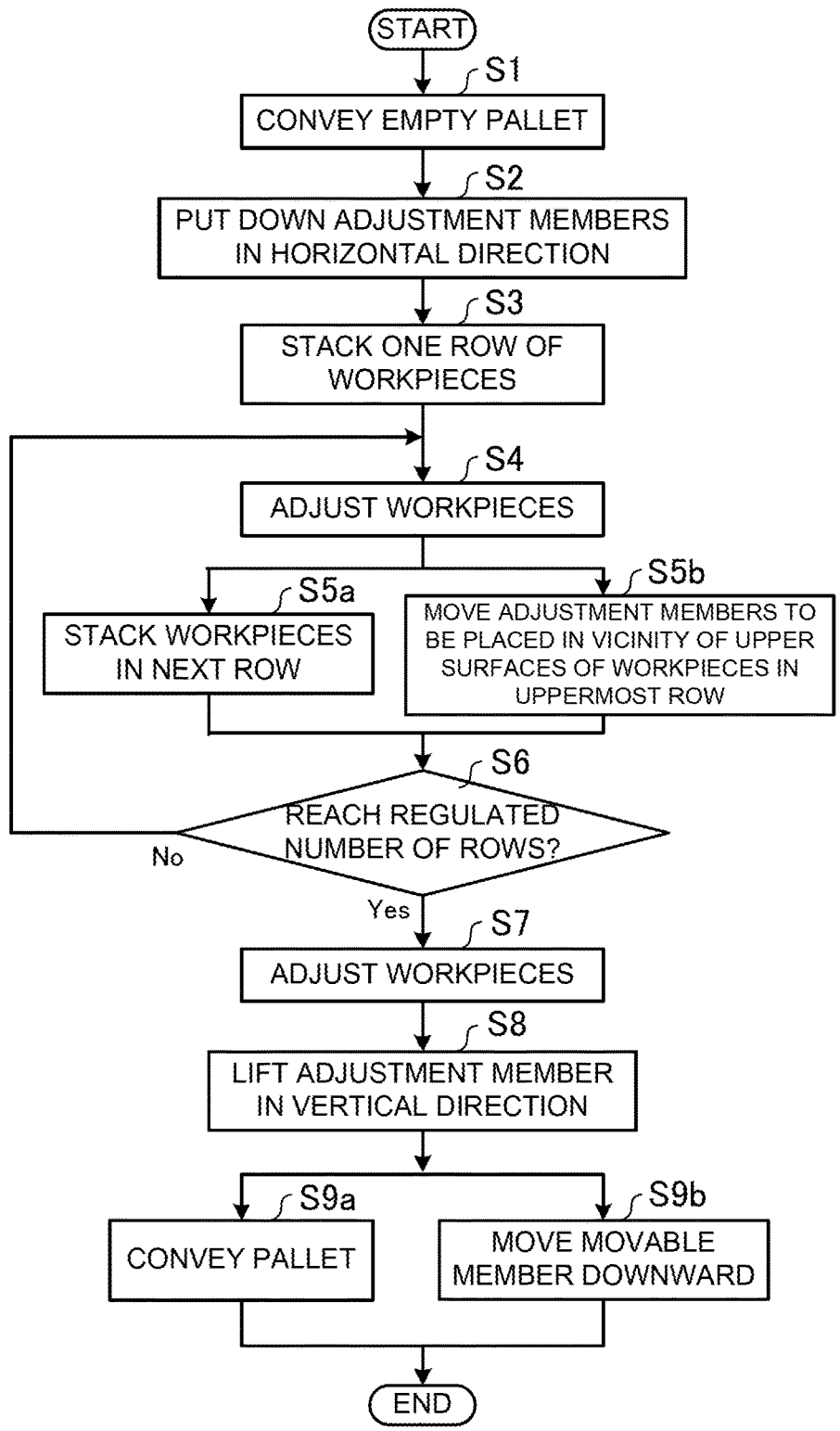

US 10,081,501 B2

ADJUSTMENT DEVICE

TECHNICAL FIELD

The present invention relates to an adjustment device.

BACKGROUND ART

Patent Literature 1 discloses a stacking correction device capable of smoothly conveying a pallet while placing as many workpieces as possible on the pallet and moving the workpieces so as to store the workpieces in a stacking area with a simple configuration.

CITATION LIST

Patent Literature

Patent Literature 1: JP 2014-156296 A

SUMMARY OF INVENTION

Technical Problem

Workpieces stacked on a pallet by a palletizing robot are stacked with gaps formed between adjacent workpieces. Such gaps are formed in order to leave a space for a thickness of a gripper of the palletizing robot as well as a space for an open and close operation of the gripper and in order to take account of dimensional tolerances of the workpieces. The stacked workpieces with the gaps formed between the adjacent workpieces are unstable, which may cause a load collapse and the like.

Therefore, an object of the present invention is to provide a technology for closing the gaps between the workpieces stacked up by the robot.

Solution to Problem

The present disclosure involves a plurality of methods for solving at least a part of the abovementioned problem. The following is an example of such methods. In order to solve the abovementioned problem, an adjustment device according to the present invention includes: a base member; a movable member provided to the base member so as to be movable in a stacking direction in which workpieces are stacked by a robot; a first adjustment member and a second adjustment member stretching toward an area where the workpieces are stacked, being provided to the movable member so that one or both of the adjustment members are movable in a direction in which both adjustment members are opposing to each other; a third adjustment member and a fourth adjustment member stretching toward the area where the workpieces are stacked, being provided to the first adjustment member so that one or both of the adjustment members are movable in a direction in which both adjustment members are opposing to each other; and a fifth adjustment member and a sixth adjustment member stretching toward the area where the workpieces are stacked, being provided to the second adjustment member so that one or both of the adjustment members are movable in a direction in which both adjustment members are opposing to each other.

Advantageous Effects of Invention

According to the present invention, it is possible to close gaps between workpieces stacked by a robot. The following description of the embodiment will clarify problems, configurations, and effects other than those mentioned above.

BRIEF DESCRIPTION OF DRAWINGS

FIGS. 7(A) and (B) are views for describing end portions of adjustment members.

FIG. 12 is a flowchart illustrating an exemplary operation of the distribution system.

DESCRIPTION OF EMBODIMENTS

Hereinafter, an embodiment of the present invention will be described with reference to the accompanying drawings.

Figure 1:
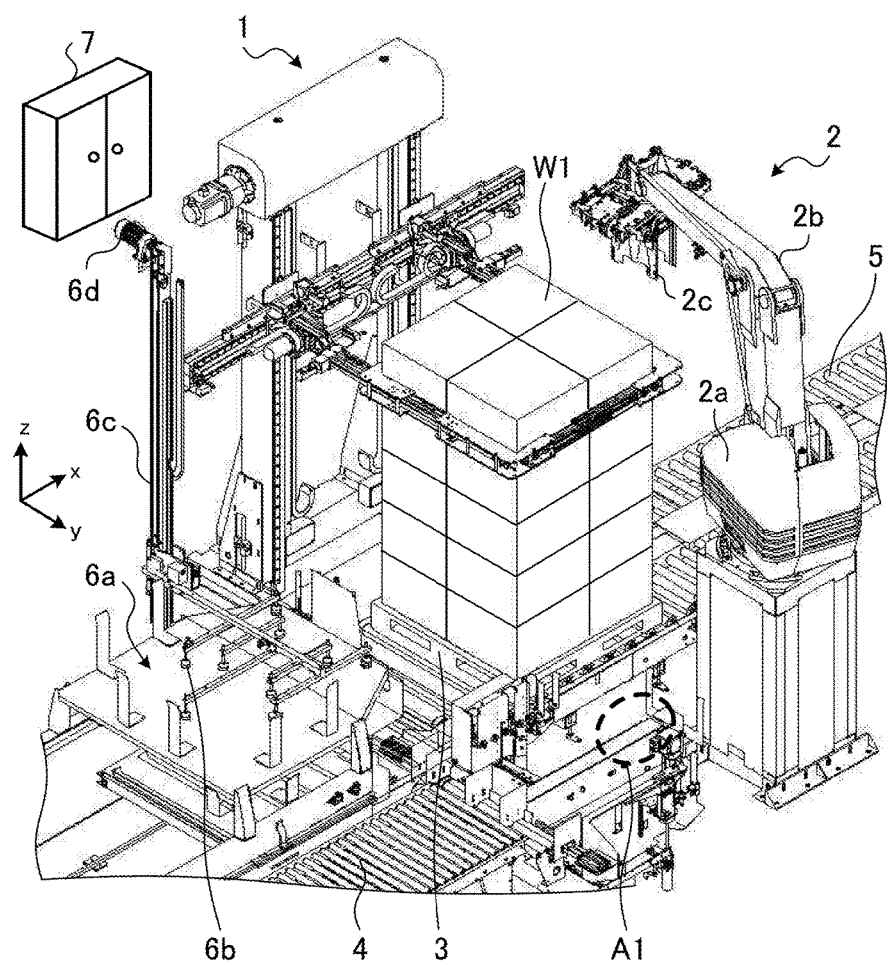
FIG. 1 is a view illustrating an exemplary configuration of a distribution system using an adjustment device according to the present invention.

FIG. 1 is a view illustrating an exemplary configuration of a distribution system using an adjustment device according to the present invention. As illustrated in FIG. 1, the distribution system includes an adjustment device 1, robot 2, pallet 3, conveyors 4 and 5, storage unit 6a, sticking unit 6b, supporting member 6c, motive power unit 6d, and control device 7.

The adjustment device 1 adjusts workpieces W1 stacked on the pallet 3. An example of the workpiece W1 is a bundle of corrugated boards before assembly bundled with a bundling string.

The workpieces W1 are stacked on the pallet 3 by the robot 2. It will be described later but note that the workpieces W1 are stacked on the pallet 3 with gaps formed between adjacent workpieces (see FIG. 3). The adjustment device 1 pushes the workpieces W1 from outer circumferential surfaces in order to close the gaps (see FIG. 4).

An example of the robot 2 is a palletizing robot. The robot 2 is disposed in a position opposing to the adjustment device 1 with an area sandwiched by the robot 2 and adjustment device 1. The area is where the workpieces W1 are stacked (for example, an area of the pallet 3 and workpieces W1 illustrated in FIG. 1). The robot 2 includes a body 2a, arm 2b, and gripper 2c.

The workpieces W1 are conveyed by the conveyor 4 to a receiving area A1 illustrated in FIG. 1. The robot 2 runs the body 2a and arm 2b so that the gripper 2c comes to a position of the receiving area A1. The robot 2 then grips the workpieces W1 carried into the receiving area A1 with using the gripper 2c and stacks them on the pallet 3. In an example illustrated in FIG. 1, four workpieces W1 are combined to make one row and stacked by the robot 2 on the pallet 3.

The pallet 3 is a load-carrying platform on which the workpieces W1 are stacked. The pallet 3 is stored under the storage unit 6a or in an upstream of a forward direction of the pallet 3. The pallet 3 is conveyed from such a position to a +x-axial direction and is disposed in the position of the pallet 3 illustrated in FIG. 1 (hereinafter may be referred to as a pallet disposed position).

The conveyor 4 conveys the workpieces W1 in the +x-axial direction. The workpieces W1 conveyed by the conveyor 4 are disposed in the receiving area A1.

When a regulated number of rows of the workpieces W1 is stacked on the pallet 3, the conveyor 5 conveys the pallet 3 in the +x-axial direction. When the pallet 3 on which the regulated number of rows of the workpieces W1 is stacked is conveyed in the +x-axial direction, the next (empty) pallet 3 is carried into the pallet disposed position from under the storage unit 6a or from the upstream of the forward direction of the pallet 3. The robot 2 stacks the workpieces W1 again on the empty pallet 3.

In the storage unit 6a, a slip sheet is stored. The slip sheet stored in the storage unit 6a is stuck by a plurality of sticking units 6b. The plurality of sticking units 6b sticking the slip sheet is lifted upward along the supporting member 6c, for example, by the motive power unit 6d which is a motor. The slip sheet lifted upward is gripped by the gripper of the robot 2 (a gripper which is different from the gripper 2c illustrated in FIG. 1 and is not denoted in FIG. 1) and is placed on the workpieces W1. Every time one row or a predetermined number of rows of the workpieces W1 is stacked, the slip sheet is placed on the workpieces W1. It should be noted that the predetermined number of rows of the workpieces W1 on which the slip sheet is placed is different from the regulated number of rows of the workpieces W1 when the pallet 3 is conveyed by the conveyor 5 (the predetermined number of rows<the regulated number of rows).

The control device 7 is a computer including CPU (Central Processing Unit), a memory, and the like. The control device 7 controls, for example, operations of the adjustment device 1, robot 2, and conveyors 5, 6 in accordance with a program stored in the memory. The control device 7 is, for example, a control board. It should be noted that the control device 7 may be divided into a plurality of configurational elements. For example, a control device controlling the robot 2 may be included in the robot 2 and a control device controlling the adjustment device 1 may be included in the adjustment device 1.

A schematic operation of the distribution system in FIG. 1 will be described. First, the empty pallet 3 is carried out to the pallet disposed position from under the storage unit 6a.

The workpieces W1 are conveyed by the conveyor 4 to the receiving area A1. The robot 2 grips the workpieces W1 conveyed to the receiving area A1 and stacks the workpieces W1 on the pallet 3.

When one row of the workpieces W1 is stacked by the robot 2, the adjustment device 1 close the gaps between the workpieces W1 in the row and adjusts the workpieces W1. In regard to an example illustrated in FIG. 1, when the four workpieces W1 are stacked in the same horizontal plane, the adjustment device 1 adjusts the workpieces W1 by pushing the outer circumferential surfaces of the four workpieces W1 so as to close the gaps therebetween. Every time one row of the workpieces W1 is stacked, the adjustment device 1 moves upward so as to adjust the stacked row of the workpieces W1.

The robot 2 stacks the workpieces W1 on the pallet 3 till the number of rows reaches the regulated number. When the regulated number of rows of the workpieces W1 is stacked, the pallet 3 is conveyed by the conveyor 5 in the +x-axial direction. Then, the next empty pallet 3 is carried to the pallet disposed position from under the storage unit 6a. The robot 2 and adjustment device 1 repeat the abovementioned stacking operation and adjusting operation of the workpieces W1.

Every time one row or the predetermined number of rows of the workpieces W1 is stacked, it should be noted that the robot 2 places the slip sheet stored in the storage unit 6a on the workpieces W1.

Figure 2:
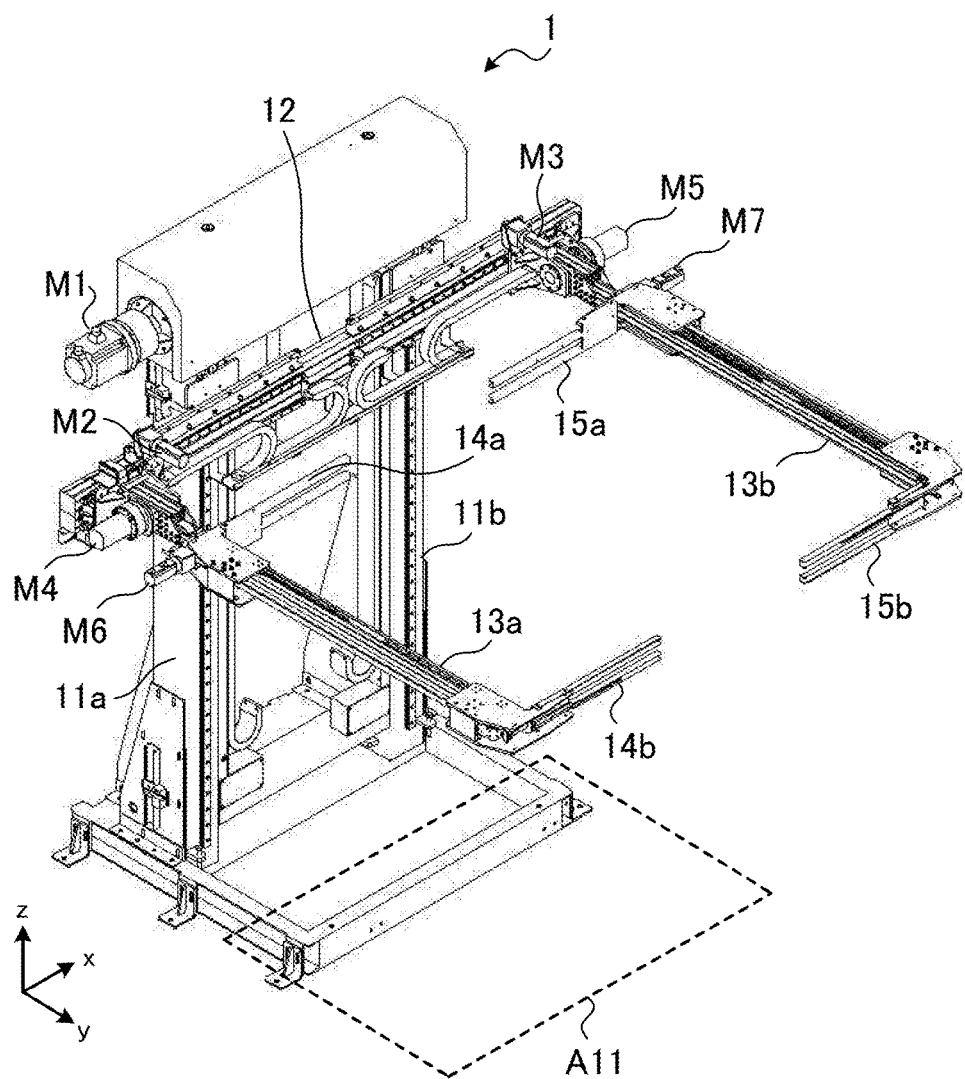
FIG. 2 is a perspective view of the adjustment device.

FIG. 2 is a perspective view of the adjustment device 1. As illustrated in FIG. 2, the adjustment device 1 includes base members 11a and 11b, a movable member 12, adjustment members 13a, 13b, 14a, 14b, 15a, and 15b, and motive power units M1 to M7. FIG. 2 illustrates a stacking area A11 on which the workpieces W1 are stacked.

Each of the base members 11a, 11b has a columnar shape. The base members 11a, 11b are disposed so that longitudinal directions thereof become perpendicular (and substantially perpendicular, like expression hereinafter also including the both meanings) to the ground. In an example in FIG. 2, the number of the base members is two, but it may be one or three or more.

The movable member 12 has a columnar shape. The movable member 12 is provided to the base members 11a, 11b so that a longitudinal direction thereof becomes perpendicular to the longitudinal directions of the base members 11a, 11b. The movable member 12 is provided to the base members 11a, 11b so as to be movable in a stacking direction (a z-axial direction) of the workpieces W1 stacked by the robot 2.

Each of the adjustment members 13a, 13b has a columnar shape. The adjustment members 13a, 13b are provided to the movable member 12 so as to stretch in a direction perpendicular to the stacking direction (z-axial direction) of the workpieces W1 and in a direction of the stacking area A11 of the workpieces W1. The adjustment members 13a, 13b are provided to the movable member 12 so as to be movable in a direction in which both members are opposing to each other (x-axial direction).

Each of the adjustment members 14a, 14b has a columnar shape. The adjustment members 14a, 14b are provided to the adjustment members 13a so as to stretch in the direction of the stacking area A11 of the workpieces W1 and to be movable in a direction in which both members are opposing to each other (y-axial direction).

Each of the adjustment members 15a, 15b has a columnar shape. The adjustment members 15a, 15b are provided to the adjustment member 13b so as to stretch in the direction of the stacking area A11 of the workpieces W1 and to be movable in a direction in which both members are opposing to each other (y-axial direction).

The adjustment members 13a, 13b and the adjustment members 14a, 14b connected to the adjustment member 13a and the adjustment members 15a, 15b connected to the adjustment member 13b are configured to be coplanar (and substantially coplanar, like expression hereinafter also including the both meanings).

An example of the motive power units M1 to M7 is a motor. The motive power unit M1 moves the movable member 12 in the vertical direction (and substantially vertical direction, like expression hereinafter also including the both meanings).

The motive power unit M2 moves the adjustment member 13a in the ±x-axial direction. The motive power unit M3 moves the adjustment member 13b in the ±x-axial direction. Accordingly, in the ±x-axial direction, the adjustment members 13a, 13b can adjust the workpieces W1 stacked on the stacking area A11.

The motive power unit M4 lifts the adjustment member 13a upward with a connecting portion of the movable member 12 and adjustment member 13a serving as a fulcrum. The motive power unit M5 lifts the adjustment member 13b upward as with a connecting portion of the movable member 12 and adjustment member 13b serving as a fulcrum. Accordingly, the longitudinal directions of the adjustment members 13a, 13b face the z-axial direction (see FIG. 11).

The motive power unit M6 moves the adjustment members 14a, 14b in the ±y-axial direction with those members linked to each other. Accordingly, in the ±y-axial direction, the adjustment members 14a, 14b can adjust the workpieces W1 stacked on the stacking area A11.

The motive power unit M7 moves the adjustment members 15a, 15b in the ±y-axial direction with those members linked to each other. Accordingly, in the ±y-axial direction, the adjustment members 15a, 15b can adjust the workpieces W1 stacked on the stacking area A11.

Figure 3:
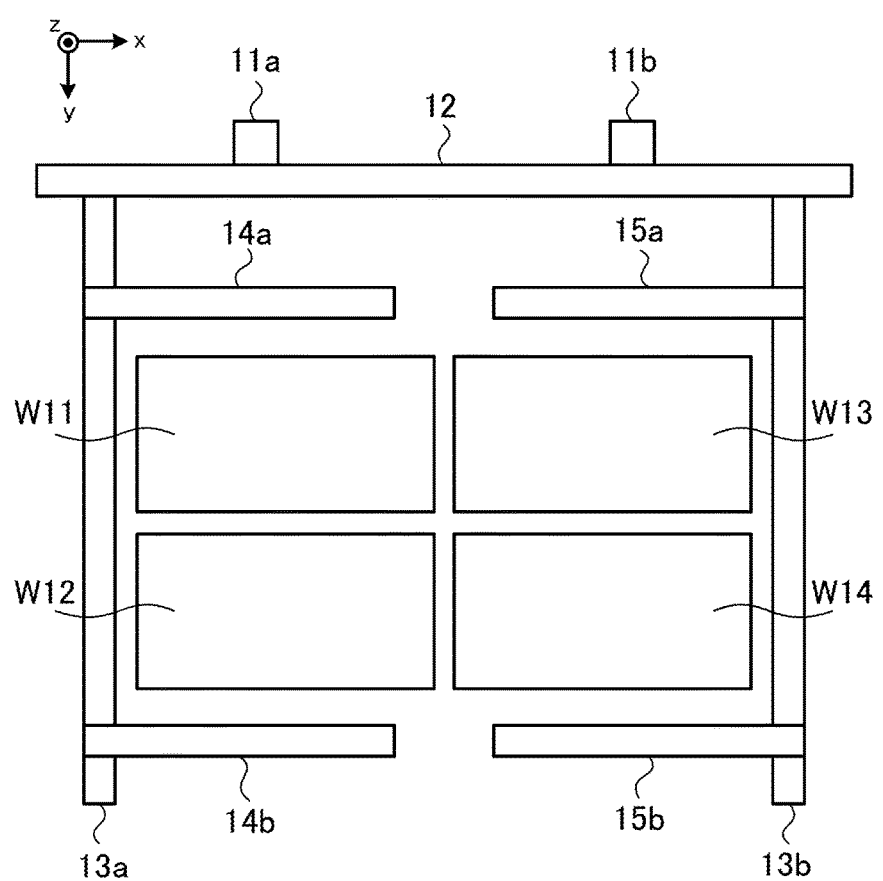
FIG. 3 is a view illustrating a state before workpieces are adjusted.

FIG. 3 is a view illustrating a state before the workpieces are adjusted. FIG. 3 illustrates a partial view when the adjustment device 1 in FIG. 2 is seen from the +z-axial direction toward the −z-axial direction. In FIG. 3, like members as the members in FIG. 2 are denoted with like reference numerals. In FIG. 3, it should be noted that a shape and the like of the adjustment device 1 in FIG. 2 are simplified.

As illustrated in FIG. 3, workpieces W11 to W14 are stacked with gaps formed between adjacent workpieces. Such gaps are formed in order to secure an area for a thickness of the gripper 2c of the robot 2 as well as an area for an open and close operation of the gripper 2c and in order to take account of dimensional tolerances of the workpieces W11 to W14.

Figure 4:
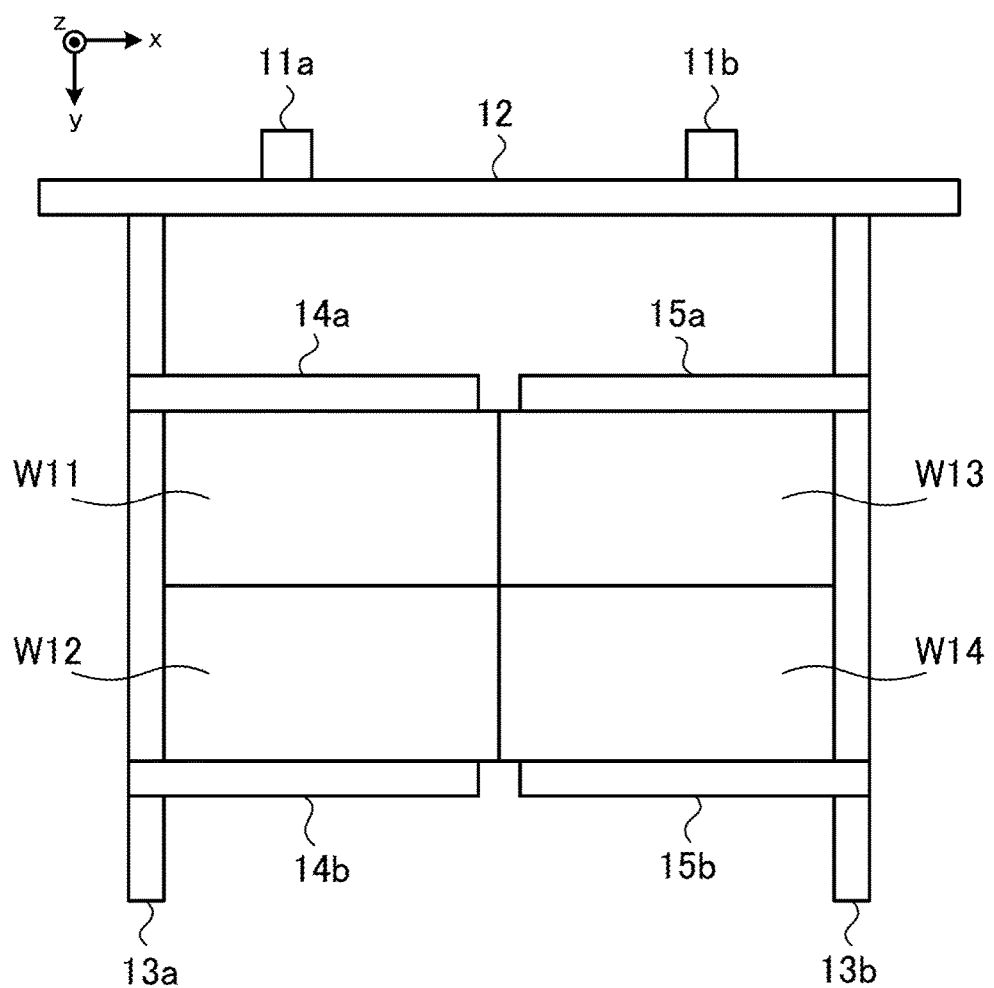
FIG. 4 is a view illustrating a state after the workpieces are adjusted.

FIG. 4 is a view illustrating a state after the workpieces are adjusted. In FIG. 4, like members as the members in FIG. 3 are denoted with like reference numerals.

When one row of the workpieces W11 to W14 is stacked, the adjustment device 1 adjusts the workpieces W11 to W14 stacked in the row. For example, the adjustment device 1 moves the adjustment members 13a, 13b in the x-axial direction so as to close a gap between the workpiece W11 and workpiece W13, and a gap between the workpiece W12 and workpiece W14. The adjustment device 1 further moves the adjustment members 14a, 14b and adjustment members 15a, 15b in the y-axial direction so as to close a gap between the workpiece W11 and workpiece W12, and a gap between the workpiece W13 and workpiece W14.

In such manners, the adjustment device 1 closes the gaps between the workpieces so that the stacked workpieces are stabilized. With the stabilization of the workpieces, the slip sheet is also stably placed on the workpieces. Furthermore, the number of the slip sheets can be reduced. What is more, no slip sheet may be necessary.

Figure 5:
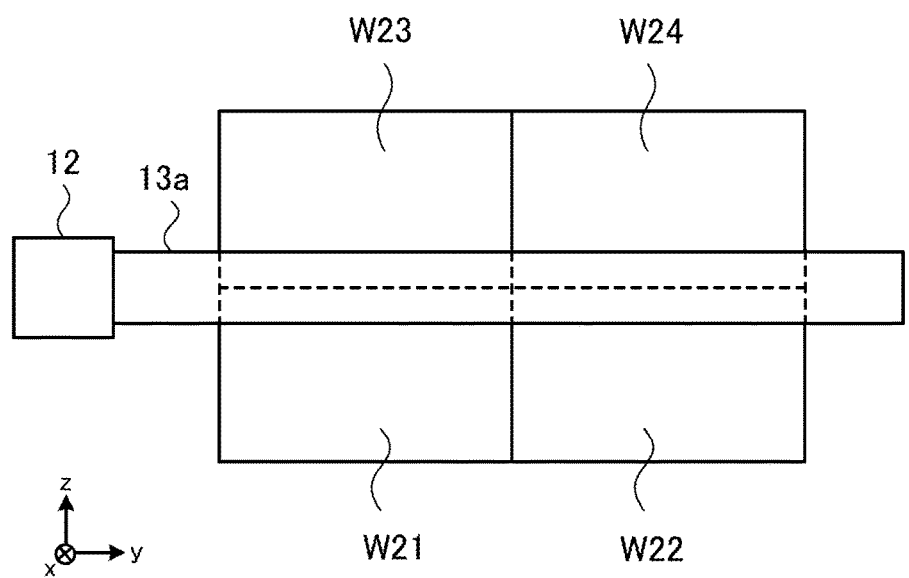
FIG. 5 is a view for describing a movement of a movable member in a stacking direction of the workpieces.

FIG. 5 is a view for describing a movement of the movable member 12 in the stacking direction of the workpieces. FIG. 5 illustrates a partial view when the adjustment device 1 in FIG. 2 is seen from the −x-axial direction toward the +x-axial direction. In FIG. 5, like members as the members in FIG. 2 are denoted with like reference numerals. In FIG. 5, it should be noted that a shape and the like of the adjustment device 1 in FIG. 2 are simplified.

When one row of the workpieces is stacked by the robot 2 (for example, in an example in the FIG. 1, four workpieces W1 are stacked in the same horizontal plane), the adjustment device 1 adjusts the stacked workpieces. For example, as illustrated in FIG. 5, when workpieces W23, W24 and two workpieces disposed in a deeper side of a sheet of the workpieces W23, W24 are stacked on workpieces W21, W22 and on two workpieces disposed in a deeper side of a sheet of the workpieces W21, W22, the adjustment device 1 adjusts those four stacked workpieces (workpieces in the uppermost row).

When adjusting the workpieces in the uppermost row, the adjustment device 1 moves the movable member 12 so that adjustment members 13a, 13b are placed at (overlap) positions of side surfaces of the workpieces in the uppermost row and side surfaces of the workpieces right below the uppermost row. For example, as illustrated in FIG. 5, the adjustment device 1 moves the movable member 12 so that the adjustment member 13a is placed at positions in side surfaces of the workpieces W23, W24 in the uppermost row and in side surfaces of the workpieces W21, W22 right below the uppermost row.

In other words, the adjustment device 1 adjusts the workpieces by pushing the adjustment members 13a, 13b, the adjustment members 14a, 14b, and the adjustment members 15a, 15b against the side surfaces of the workpieces in the uppermost row and against the side surfaces of the workpieces right below the uppermost row. Accordingly, the workpieces stacked on the pallet 3 are aligned in the vertical direction.

Figure 6:
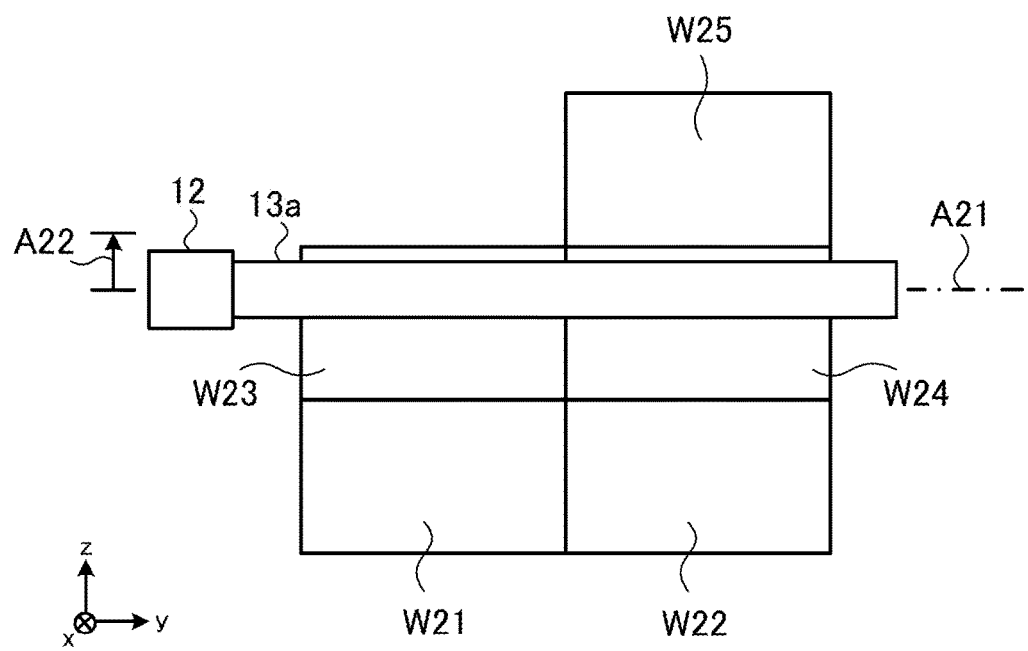
FIG. 6 is another view for describing the movement of the movable member in the stacking direction of the workpieces.

FIG. 6 is another view for describing the movement of the movable member 12 in the stacking direction of the workpieces. In FIG. 6, like members as the members in FIG. 5 are denoted with like reference numerals.

When the workpieces in the uppermost row is adjusted by the adjustment device 1, the robot 2 stacks workpieces in the next row on the workpieces in the uppermost row. For example, as illustrated in FIG. 6, the robot 2 stacks workpieces W25 on the workpieces W24.

After adjusting the workpieces in the uppermost row, the adjustment device 1 moves the movable member 12 upward while the robot 2 stacks the workpieces in the next row on the workpieces in the uppermost row. For example, the adjustment device 1 moves the movable member 12 upward and makes it stand by so that the adjustment member 13a placed between the side surfaces of the workpieces W23, W24 and the side surfaces of the workpieces W21, W22 (for example, the adjustment member 13a in the state illustrated in FIG. 5) is placed in a vicinity of upper surfaces of the workpieces W23, W24 while the robot 2 stacks the workpieces in the next row on the workpieces W23, W24 in the uppermost row. More specifically, the adjustment device 1 moves the movable member 12 upward and makes it stand by so that a center line indicated by an arrow A21 of the adjustment member 13a is placed at a position higher than a half height of the workpiece W24. The adjustment device 1 further moves the movable member 12 upward and makes it stand by so that an upper surface of the adjustment member 13a is placed at a position lower than the upper surfaces of the workpieces W23, W24.

Accordingly, a time for the movable member 12 to move is shortened when adjusting the workpieces in the next row. For example, in regard to a moving distance of the movable member 12, a distance indicated by an arrow A22 in FIG. 6 is enough so that the time for the movable member 12 to move is shortened when adjusting the workpieces in the next row. Moreover, the robot 2 can stack the regulated number of rows of the workpieces on the pallet 3 rapidly.

As mentioned above, the adjustment members 13a, 13b, 14a, 14b, 15a, 15b are configured to be coplanar and the upper surfaces of these adjustment members are disposed lower than the upper surfaces of the workpieces W23, W24. Accordingly, the robot 2 can stack the workpieces in the next row on the workpieces in the uppermost row without being in contact with the adjustment members 13a, 13b, 14a, 14b, 15a, 15b. A preventing operation or waiting time in order to prevent a contact with the adjustment device 1 is not necessary for the robot 2.

FIGS. 7(A) and (B) are views for describing end portions of the adjustment members 14b, 15b. FIGS. 7(A) and (B) illustrate partial views when the adjustment device 1 in FIG. 2 is seen from the +y-axial direction toward the −y-axial direction. In FIGS. 7(A) and (B), like members as the members in FIG. 2 are denoted with like reference numerals. In FIGS. 7(A) and (B), it should be noted that a shape and the like of the adjustment device 1 in FIG. 2 are simplified.

The end portions of the adjustment member 14b and adjustment member 15b are configured to intersect (overlap). For example, as illustrated in FIG. 7(A), the adjustment member 14b includes claw parts 14ba, 14bb in an end portion of a surface opposing to the adjustment member 15b. The adjustment member 15b includes claw parts 15ba, 15bb in an end portion of a surface opposing to the adjustment member 14b. As illustrated in FIG. 7(B), the claw parts 14ba, 14bb of the adjustment member 14b and the claw parts 15ba, 15bb of the adjustment member 15b are configured to intersect mutually.

Although it is not illustrated in FIGS. 7(A) and (B), it should be noted that the adjustment member 14a also includes claw parts similar to those of the adjustment member 14b. The adjustment member 15a also includes claw parts similar to those of the adjustment member 15b.

Shapes of the end portions of the adjustment members 14a, 14b and adjustment members 15a, 15b should not be restricted to the shapes of the claw parts illustrated in FIGS. 7(A) and (B). In other words, the end portions of the adjustment members 14a, 14b and adjustment members 15a, 15b are preferably configured to intersect when they come close to each other. In an example illustrated in FIG. 7(A), the adjustment member 14b and adjustment member 15b respectively include two claw parts 14ba, 14bb and claw parts 15ba, 15bb. However, the adjustment member 14b may simply include the claw part 14ba and the adjustment member 15b may simply include the claw part 15ba.

Figure 8:
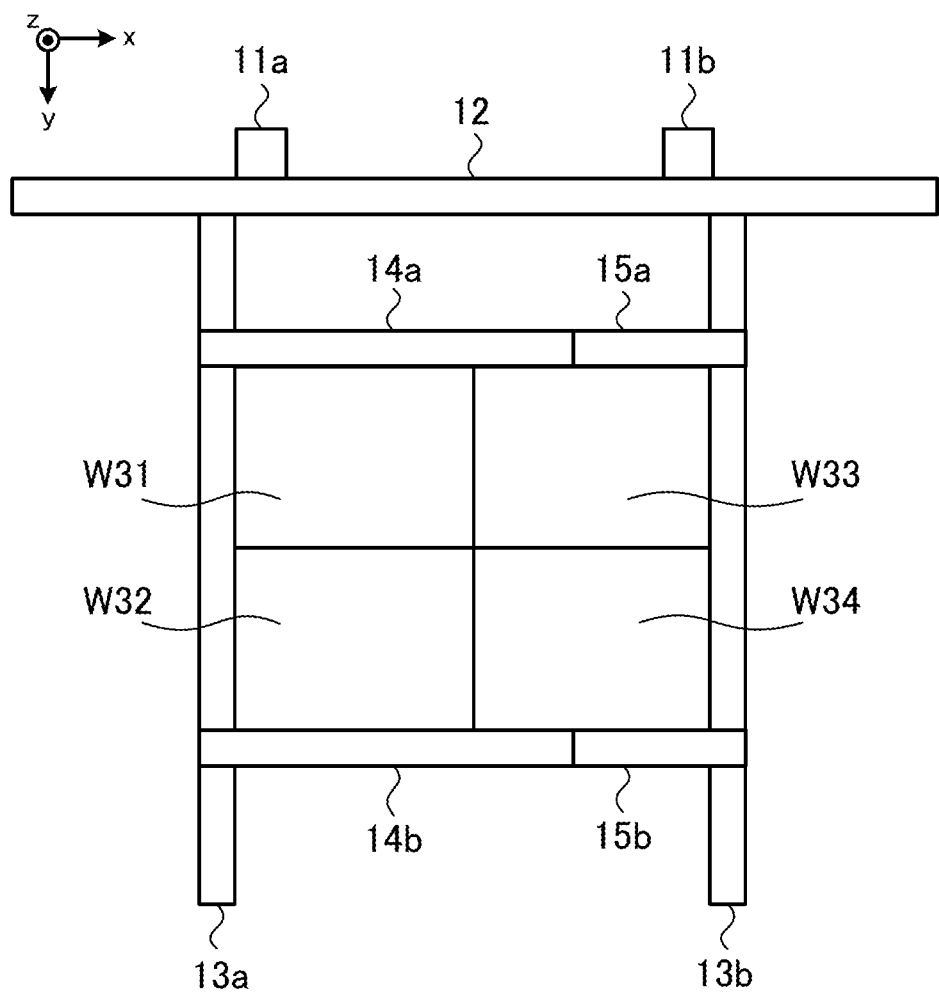
FIG. 8 is a view for describing an adjusting operation in a case where workpieces are small.

FIG. 8 is a view for describing an adjusting operation in a case where workpieces are small. In FIG. 8, like members as the members in FIG. 4 are denoted with like reference numerals. In regard to workpieces W31 to W34 illustrated in FIG. 8, assumed that sizes thereof in the x-axial direction is small. For example, a total of a length of the workpiece W31 in the x-axial direction illustrated in FIG. 8 and a length of the workpiece W33 in the x-axial direction is smaller than a total of a length of the adjustment member 14a in the x-axial direction and a length of the adjustment member 15a in the x-axial direction.

As described in FIGS. 7(A) and (B), the adjustment members 14a, 14b and adjustment members 15a, 15b are configured to intersect in the end portions where they are opposing to each other. Therefore, even when the sizes of the workpieces W31 to W34 in the x-axial direction is small, the adjustment device 1 can adjust the workpieces W31 to W34 by intersecting the end portions (claw parts) of the adjustment members 14a, 14b and the end portions (claw parts) of the adjustment members 15a, 15b as illustrated in FIG. 8.

In other words, even though the total length in the x-axial direction of the workpieces arranged in the x-axial direction (for example, a length of the workpieces W31, W33 in the x-axial direction) is shorter than the lengths of the adjustment members 14a, 14b and adjustment members 15a, 15b in the x-axial direction, the adjustment device 1 can appropriately adjust the workpieces by intersecting the end portions of the adjustment members 14a, 14b and adjustment members 15a, 15b.

Figure 9:
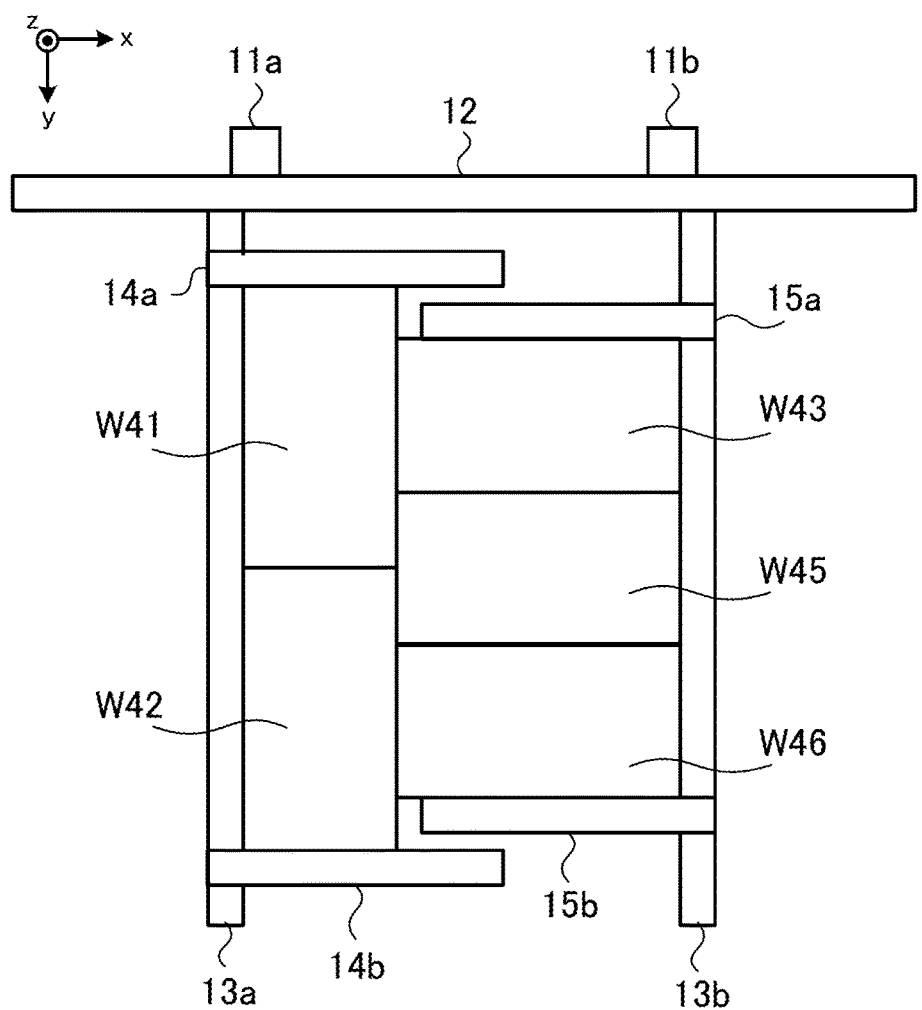
FIG. 9 is a view for describing an adjusting operation in a case where outer circumferential surfaces of stacked workpieces are not quadrilateral.

FIG. 9 is a view for describing an adjusting operation in a case where outer circumferential surfaces of stacked workpieces are not quadrilateral. In FIG. 9, like members as the members in FIG. 4 are denoted with like reference numerals.

In the adjusting operation illustrated with reference to FIG. 4 and FIG. 8, the outer circumferential surfaced of the workpieces are quadrilateral. Provided with six adjustment members 13a, 13b, 14a, 14b, 15a, 15b, the adjustment device 1 can adjust the workpieces even in a case where the outer circumferential surfaces of the workpieces have shapes other than the quadrilateral shape. For example, as illustrated in FIG. 9, the adjustment device 1 can appropriately adjust workpieces W41 to W46 even in a case where outer circumferential surfaces of the workpieces W41 to W46 have eight surfaces.

The adjustment device 1 is provided with six adjustment members in such manners and those six adjustment members respectively press the six outer circumferential surfaces of the workpieces so that it is possible to adjust the workpieces having the outer circumferential surfaces other than the quadrilateral shape.

Figure 10:
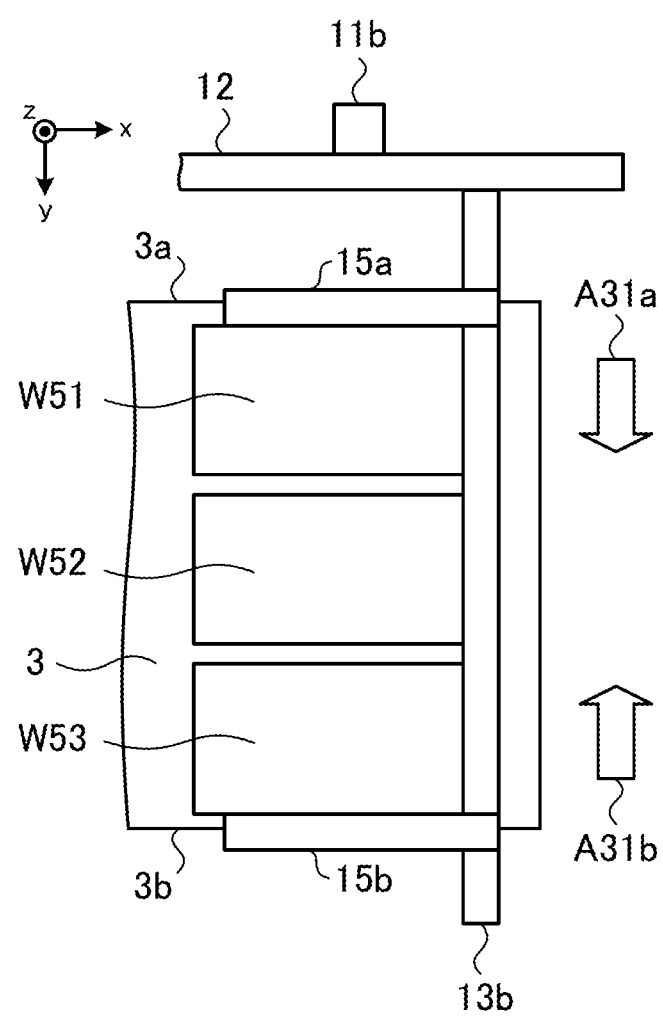
FIG. 10 is a view for describing adjustment positions on a pallet of workpieces.

FIG. 10 is a view for describing adjustment positions on the pallet 3 of the workpieces. FIG. 10 illustrates a half of a right-hand side in FIG. 4. In FIG. 10, like members as the members in FIG. 4 are denoted with like reference numerals. FIG. 10 further illustrates the pallet 3 and workpieces W51 to W53 stacked on the pallet 3.

The adjustment device 1 includes two adjustment members 15a, 15b configured to adjust the workpieces W51 to W53 in the y-axial direction. Therefore, the adjustment device 1 can adjust the workpieces W51 to W53 from two directions indicated by an arrow A31a and an arrow A31b. Accordingly, the adjustment device 1 can adjust the workpieces W51 to W53 at any position on the pallet 3 in the y-axial direction.

For example, the adjustment device 1 can adjust the workpieces W51 to W53 at a central portion of the pallet 3 in the y-axial direction. Alternatively, the adjustment device 1 can adjust the workpieces W51 to W53 with the workpieces drawn near a side 3a of the pallet 3. Alternatively, the adjustment device 1 can adjust the workpieces W51 to W53 with the workpieces drawn near a side 3b of the pallet 3.

It should be noted that the adjustment members 14a, 14b not illustrated in FIG. 10 can also adjust the workpieces at any position on the pallet 3 in the y-axial direction. Similarly, the adjustment members 13a, 13b can also adjust the workpieces at any position on the pallet 3 in the x-axial direction.

Figure 11:
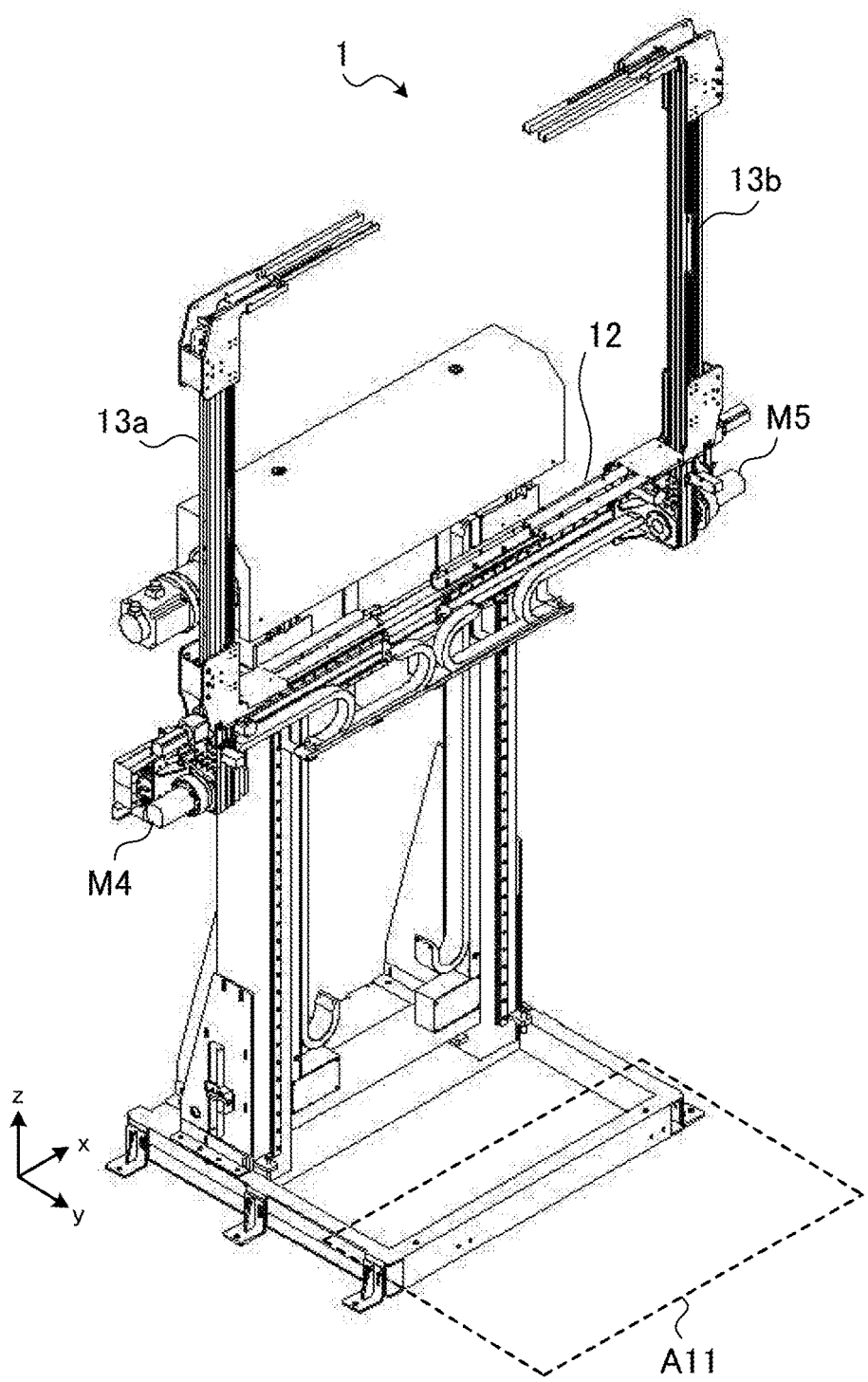
FIG. 11 is a view for describing an operation of the adjustment device in a case where a regulated number of rows of the workpieces is stacked on the pallet.

FIG. 11 is a view for describing an operation of the adjustment device 1 in a case where the regulated number of rows of the workpieces is stacked on the pallet 3. In FIG. 11, like members as the members in FIG. 2 are denoted with like reference numerals.

As described in FIG. 2, the adjustment members 13a, 13b illustrated in FIG. 11 are lifted by the motive power units M4, M5 respectively so that the longitudinal directions of the adjustment members become parallel (and substantially parallel, like expression hereinafter also including the both meanings) to the stacking direction of the workpieces. When the regulated number of rows of the workpieces is stacked on the pallet 3, the adjustment members 13a, 13b are lifted so that the longitudinal directions thereof become parallel to the stacking direction of the workpieces. The pallet 3 on which the regulated number of rows of the workpieces is stacked is moved to a different place by the conveyor 5. Accordingly, when the regulated number of rows of the workpieces is stacked, the pallet 3 is conveyed by the conveyor 5 without being in contact with the adjustment device 1.

Simultaneous (and substantially simultaneous, like expression hereinafter also including the both meanings) with the conveyance of the pallet 3, the movable member 12 is moved downward to a predetermined position which will be described later. When the movable member 12 is moved downward to the predetermined position which will be described later, and the empty pallet 3 is disposed in the pallet disposed position, the adjustment members 13a, 13b are put down so that the longitudinal directions of the adjustment members 13a, 13b face the direction of the stacking area A11 (y-axial direction) of the workpieces.

In such manners, the movable member 12 moves downward while the pallet 3 is conveyed (while the workpieces are moved to the different place). Accordingly, a starting time of stacking the workpieces on the next pallet 3 will be shorten. After the empty pallet 3 is disposed in the pallet disposed position, the adjustment members 13a, 13b are put down so that the longitudinal directions thereof face the y-axial direction. Accordingly, the adjustment members 13a, 13b will not be in contact with the empty pallet 3 conveyed to the pallet disposed position.

The predetermined position of the movable member 12 will be hereinafter described. The predetermined position of the movable member 12 is a position where the upper surfaces of the adjustment members 13a, 13b, 14a, 14b, 15a, 15b become lower than the upper surface of the empty pallet 3 disposed in the pallet disposed position when the adjustment members 13a, 13b are put down so that the longitudinal directions thereof face the y-axial direction. Accordingly, above the empty pallet 3 disposed in the pallet disposed position, there is no area (space) to prevent the operation of the robot 2 which stacks the workpieces in a first row. Therefore, the robot 2 can stack the workpieces without any useless motion (for example, a motion to avoid the adjustment member in a case where the adjustment member is disposed above the empty pallet 3).

FIG. 12 is a flowchart illustrating an operational example of the distribution system. The distribution system repeatedly carries out operations of the flowchart illustrated in FIG. 12.

First, the control device 7 conveys the empty pallet 3 to the pallet disposed position (Step S1). For example, the control device 7 conveys the empty pallet to the position of the pallet 3 illustrated in FIG. 1.

Next, the control device 7 puts down the adjustment members 13a, 13b lifted up in the vertical direction of the adjustment device 1 in the horizontal direction (Step S2).

Next, the control device 7 conveys the workpieces by the conveyor 4 to the receiving area A1 and stacks one row of the workpieces conveyed to the receiving area A1 on the pallet 3 by the robot 2 (Step S3). For example, as illustrated in FIG. 1, the control device 7 stacks four workpieces W1 in the same horizontal plane.

Next, the control device 7 adjusts one row of the workpieces stacked in Step S3 by the adjustment device 1 (Step S4). For example, as illustrated in FIG. 3 and FIG. 4, the control device 7 closes the gaps between the workpieces by the adjustment device 1.

Next, the control device 7 stacks the workpieces in the next row by the robot 2 on the workpieces adjusted in Step S4 (Step S5a).

Simultaneous with the process in Step S5a, the control device 7 further lifts the movable member 12 so that the adjustment members 13a, 13b of the adjustment device 1 is placed in a vicinity of the upper surfaces of the workpieces in the uppermost row (Step S5b). For example, the control device 7 lifts the movable member 12 as illustrated in FIG. 5 and FIG. 6.

Next, the control device 7 determines whether the rows of the workpieces on the pallet 3 reach the regulated number (Step S6). When the workpieces on the pallet 3 are determined not to reach the regulated number of rows ("No" in S6), the control device 7 moves on to the process in Step S4. When the workpieces on the pallet 3 are determined to reach the regulated number of rows ("Yes" in S6), the control device 7 moves on to a process in Step S7.

When the workpieces on the pallet 3 are determined to reach the regulated number of rows ("Yes" in S6) in Step S6, the control device 1 adjusts the workpieces in a row of the regulated number (Step S7).

Next, the control device 7 lifts the adjustment members 13a, 13b in the vertical direction (Step S8). For example, the control device 7 lifts the adjustment members 13a, 13b in the vertical direction as illustrated in FIG. 11.

Next, the control device 7 conveys by the conveyor 5 the pallet 3 on which the regulated number of rows of the workpieces is stacked (Step S9a). For example, the control device 7 conveys the pallet 3 in the +x-axial direction in FIG. 1.

Simultaneous with the process in Step S9a, the control device 7 moves the movable member 12 of the adjustment device 1 downward (Step S9b). For example, the control device 7 moves the movable member 12 downward to the abovementioned predetermined position with the adjustment members 13a, 13b of the adjustment device 1 lifted in the vertical direction.

The control device 7 completes the processes in the flowchart and repeatedly carries out the process in Step S1.

It should be noted that the control device 7 may simultaneously convey the pallet 3 on which the workpieces are stacked (the process in Step S9a) and carry in the empty pallet 3 to the pallet disposed position (the process in Step S1).

Although it is not illustrated in FIG. 12, every time one row or the predetermined number of rows of the workpieces W1 is stacked, the control device 7 places the slip sheet stored in the storage unit 6a on the workpieces W1 with using the robot 2.

The adjustment device 1 includes the base members 11a, 11b and the movable member 12 provided to the base members 11a, 11b so as to be movable in the stacking direction of the workpieces stacked by the robot 2 in such manners. The adjustment device 1 also includes the adjustment members 13a, 13b stretching in the direction of the stacking area A11 of the workpieces and provided to the movable member 12 so as to be movable in the direction in which both adjustment members 13a, 13b are opposing to each other. The adjustment device 1 further includes the adjustment members 14a, 14b stretching in the direction of the stacking area A11 of the workpieces and provided to the adjustment member 13a so as to be movable in the direction in which both adjustment members 14a, 14b are opposing to each other. Still further, the adjustment device 1 includes the adjustment members 15a, 15b stretching in the direction of the stacking area A11 of the workpieces and provided to the adjustment member 13b so as to be movable in the direction in which both adjustment members 15a, 15b are opposing to each other. Accordingly, the adjustment device 1 can close the gaps between the workpieces stacked by the robot 2. Moreover, the workpieces are stacked on the pallet 3 with the gaps closed so that the pallet 3 can be stably conveyed.

In the abovementioned embodiment, the adjustment members 14b, 15b are configured to move with respect to the adjustment members 13a, 13b. However, it should be noted that the adjustment members 14b, 15b may be fixed with respect to the adjustment members 13a, 13b. In other words, only the adjustment members 14a, 15a may be configured to move with respect to the adjustment members 13a, 13b. In such a case, the adjustment members 14b, 15b may not be in the same line (for example, a distance between the adjustment member 14b and the movable member 12 may be different from a distance between the adjustment member 15b and the movable member 12). Even in accordance with such a case, the adjustment device 1 can close the gaps between the workpieces stacked by the robot 2. Similar to the abovementioned configuration, the adjustment members 14a, 15a may also be fixed with respect to the adjustment members 13a, 13b. Similar to the abovementioned configuration, one of the adjustment members 13a, 13b may be fixed with respect to the movable member 12. By fixing one of the opposing adjustment members in such manners, it is possible to reduce costs of the adjustment device 1.

A method for stacking the workpieces on the pallet should not be restricted to the illustrated example. For example, the robot 2 may stack the workpieces on the pallet 3 in a pinwheel pattern with four cartons, and the adjustment device 1 may adjust the workpieces.

The adjustment members 14a, 14b herein are linked and move in the ±y-axial direction, but the both members may move independently. The adjustment members 15a, 15b herein are linked and move in the ±y-axial direction, but the both members may move independently.

When the adjustment device 1 is not in operation, the adjustment device 1 may be posed as illustrated in FIG. 11. Accordingly, it is possible to prevent the adjustment device 1 from obstructing the stacking operation of the workpieces carried out by the robot 2.

The present invention has been described with the illustrations of the embodiment, but the technical scope of the present invention should not be restricted to the scope described in the abovementioned embodiment. It is obvious to those skilled in the art that the abovementioned embodiment can be modified or changed variously. It is also obvious from the claims that such modified or changed embodiments can also be involved in the technical scope of the present invention.

Furthermore, each process of the abovementioned flowchart is divided in accordance with a main content of each process in order to make the processes of the distribution system understood easily. The present invention should not be restricted to a method or a name of dividing the process units. The processes of the distribution system can be divided into much more process units in accordance with contents of the processes. Furthermore, one process unit may also be divided so as to include much more processes.

REFERENCE SIGNS LIST

1 ADJUSTMENT DEVICE
2 ROBOT
2a BODY
2b ARM
2c GRIPPER
3 PALLET
4, 5 CONVEYOR
6a STORAGE UNIT
6b STICKING UNIT
6c FRAME
7 CONTROL DEVICE
W1 WORKPIECE
A1 RECEIVING AREA
11a, 11b BASE MEMBER
12 MOVABLE MEMBER
13a, 13b, 14a, 14b, 15a, 15b ADJUSTMENT MEMBER
M1 to M7 MOTIVE POWER UNIT
A11 STACKING AREA
14ba, 14bb, 15ba, 15bb CLAW PART

The invention claimed is:

1. An adjustment device, comprising:
a base member that extends longitudinally in a first direction;
a movable member mounted on the base member so as to be movable relative to the base member in a stacking direction in which workpieces are stacked by a robot, the moveable member has a columnar shape and the movable member extends longitudinally in a second direction that is perpendicular to the first direction;
a first motor in driving engagement with the movable member to actuate the movable member in the stacking direction;
a first adjustment member and a second adjustment member each of which has a columnar shape and each of which extends longitudinally in a third direction, away from the movable member, that is perpendicular to the first direction and perpendicular to the second direction, the first adjustment member and the second adjustment are movably mounted on the movable member so as to be movable relative to the movable member toward and away from one another in a direction that is parallel to the second direction;
a second motor in driving engagement with the first adjustment member to actuate the first adjustment member in the direction that is parallel to the second direction;
a third motor in driving engagement with the second adjustment member to actuate the second adjustment member in the direction that is parallel to the second direction;
a third adjustment member and a fourth adjustment member movably mounted on the first adjustment member so as to be movable relative to the first adjustment member toward and away from one another in a direction that is parallel to the third direction, the third adjustment member and the fourth adjustment member each has a columnar shape and each extends longitudinally, toward the second adjustment member, in a fourth direction that is parallel to the second direction and perpendicular to the third direction;
a fourth motor in driving engagement with each of the third adjustment member and the fourth adjustment member to actuate the third adjustment member and the fourth adjustment member in the direction that is parallel to the third direction;
a fifth adjustment member and a sixth adjustment member movably mounted on the second adjustment member so as to be movable relative to the second adjustment member toward and away from one another in a direction that is parallel to the third direction, the fifth adjustment member and the sixth adjustment member each have a columnar shape and each extends longitudinally, toward the first adjustment member, in a fifth direction that is parallel to the second direction, parallel to the fourth direction, and perpendicular to the third direction; and a fifth motor in driving engagement with each of the fifth adjustment member and the sixth adjustment member to actuate the fifth adjustment member and the sixth adjustment member in the direction that is parallel to the third direction.

2. The adjustment device according to claim 1,
wherein the stacking direction is vertical relative to ground, and the movable member is movable vertically relative to the base member.

3. The adjustment device according to claim 1,
wherein the first adjustment member and the second adjustment member are each pivotally attached to the movable member so as to be pivotable relative to the movable member between the third direction and a direction that is parallel to the first direction;

a sixth motor in driving engagement with the first adjustment member to pivot the first adjustment member relative to the movable member; and a seventh motor in driving engagement with the second adjustment member to pivot the second adjustment member relative to the movable member.

4. The adjustment device according to claim 3,
wherein the third adjustment member and the fourth adjustment member move with the first adjustment member when the first adjustment member pivots relative to the movable member, and the fifth adjustment member and the sixth adjustment member move with the second adjustment when the second when the second adjustment member pivots relative to the movable member.

5. The adjustment device according to claim 1,
wherein an end portion of the third adjustment member and an end portion of the fifth adjustment member are configured to overlap one another; and an end portion of the fourth adjustment member and an end portion of the sixth adjustment member are configured to overlap one another.

6. The adjustment device according to claim 1,
wherein the first adjustment member, the second adjustment member, the third adjustment member, the fourth adjustment member, the fifth adjustment member, and the sixth adjustment member are substantially coplanar.

* * * * *